United States Patent
Matsushita

(10) Patent No.: US 9,308,795 B2
(45) Date of Patent: Apr. 12, 2016

(54) SUSPENSION SUPPORT STRUCTURE

(71) Applicant: HONDA MOTOR CO., LTD., Minato-Ku, Tokyo (JP)

(72) Inventor: Kosuke Matsushita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/368,526

(22) PCT Filed: Nov. 13, 2012

(86) PCT No.: PCT/JP2012/079355
§ 371 (c)(1),
(2) Date: Jun. 25, 2014

(87) PCT Pub. No.: WO2013/099457
PCT Pub. Date: Jul. 4, 2013

(65) Prior Publication Data
US 2014/0374975 A1    Dec. 25, 2014

(30) Foreign Application Priority Data
Dec. 26, 2011    (JP) ................... 2011-283720

(51) Int. Cl.
*B60G 13/00*    (2006.01)
*B60G 15/06*    (2006.01)
(Continued)

(52) U.S. Cl.
CPC ............ *B60G 15/067* (2013.01); *B60G 13/003* (2013.01); *F16F 1/3842* (2013.01);
(Continued)

(58) Field of Classification Search
CPC ............. B60G 15/067; B60G 2202/32; B60G 2204/16; B60G 2204/418; B60G 2204/128; B60G 2202/312; B60G 13/003; B60G 15/068; B60G 2202/24; B60G 2204/41044; B60G 2204/43; B60G 2206/82092; B60G 2206/722; B60G 2206/73; B60G 2206/8102; F16F 9/54; F16F 1/3842
USPC ......... 267/220, 140.11, 140.13, 141.1, 141.2; 188/321.11; 280/124.147
See application file for complete search history.

(56) References Cited

U.S. PATENT DOCUMENTS 5,040,775 A * 8/1991 Miyakawa .................... 267/220
5,263,692 A * 11/1993 Ito ............................ 267/140.12
(Continued)

FOREIGN PATENT DOCUMENTS

DE    19719301 A1    11/1998
EP    2251218 A1    11/2010
(Continued)

OTHER PUBLICATIONS

Office Action issued in the corresponding Japanese Patent Application with a mailing date of Jul. 7, 2015 and a partial English translation thereof.

(Continued)

*Primary Examiner* — Pamela Rodriguez
(74) *Attorney, Agent, or Firm* — Carrier Blackman & Associates, P.C.; Joseph P. Carrier; William D. Blackman

(57) ABSTRACT

In a suspension support structure, an upper end of a piston rod of a damper is supported by a vehicle body. The suspension support structure is provided with a base body and a lid body which is press-fitted in the base body. The base body has a peripheral wall extending from a flange joined to the vehicle body, and a bottom formed at the lower end of the peripheral wall and through which the piston rod is inserted. An elastic body and the upper end of the piston rod are supported on the bottom. The lid-body is press-fitted to the inner surface of the peripheral wall such that the lid body covers at least the upper surface of the elastic body while facing the bottom of the base body. When the lid body is attached to the base body is contained below the upper end of the peripheral wall.

11 Claims, 7 Drawing Sheets

(51) Int. Cl.
*F16F 9/54* (2006.01)
*F16F 1/38* (2006.01)

(52) U.S. Cl.
CPC .............. *F16F 9/54* (2013.01); *B60G 2202/24* (2013.01); *B60G 2202/32* (2013.01); *B60G 2204/128* (2013.01); *B60G 2204/16* (2013.01); *B60G 2204/41* (2013.01); *B60G 2204/41044* (2013.01); *B60G 2204/43* (2013.01); *B60G 2206/722* (2013.01); *B60G 2206/73* (2013.01); *B60G 2206/8102* (2013.01); *B60G 2206/82092* (2013.01)

(56) References Cited

U.S. PATENT DOCUMENTS

| | | | |
|---|---|---|---|
| 5,775,720 A | 7/1998 | Kmiec et al. | |
| 6,616,160 B2* | 9/2003 | Tadano | 280/124.147 |
| 7,178,795 B2* | 2/2007 | Huprikar et al. | 267/141.1 |
| 7,350,779 B2* | 4/2008 | Tamura | 267/220 |
| 2003/0178269 A1 | 9/2003 | Hayashi et al. | |
| 2003/0189278 A1* | 10/2003 | Kawada et al. | 267/292 |
| 2004/0017035 A1* | 1/2004 | Treder et al. | 267/220 |

FOREIGN PATENT DOCUMENTS

| | | |
|---|---|---|
| JP | H04-285340 A | 10/1992 |
| JP | 2008-044452 A | 2/2008 |
| JP | 2009-210062 A | 9/2009 |
| JP | 2009-264551 A | 11/2009 |
| JP | 2011-088570 A | 5/2011 |
| WO | 2006006203 A1 | 1/2006 |

OTHER PUBLICATIONS

Extended European Search Report dated Sep. 18, 2015 issued in the corresponding European Patent Application No. EP 12 86 2062.

* cited by examiner

FIG.6
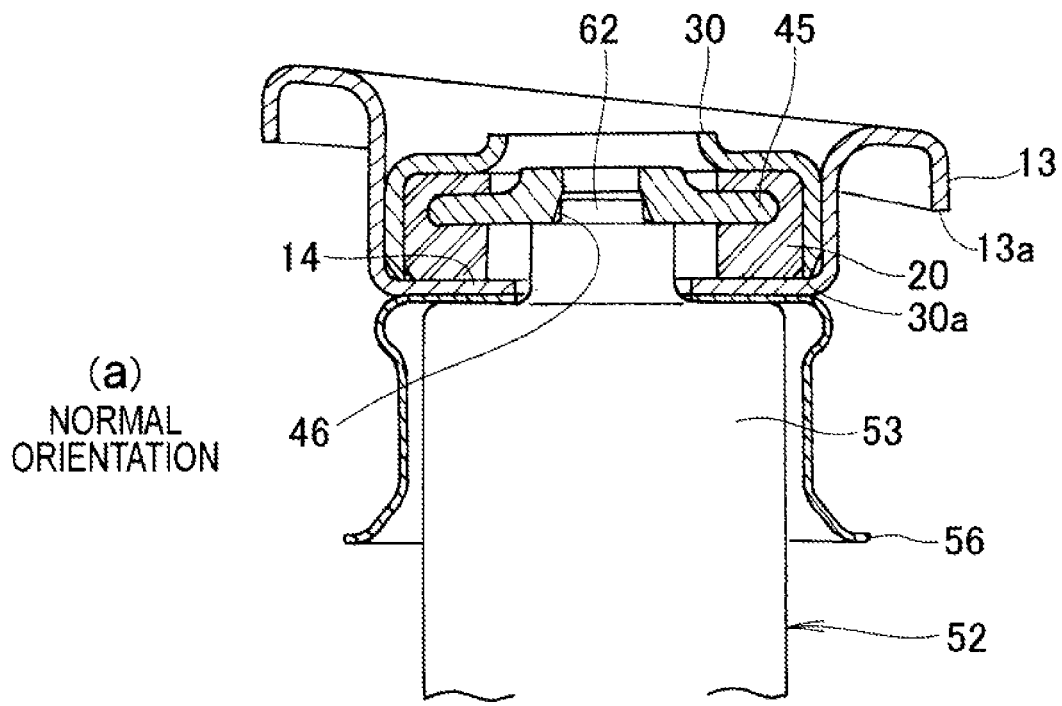
(a) NORMAL ORIENTATION
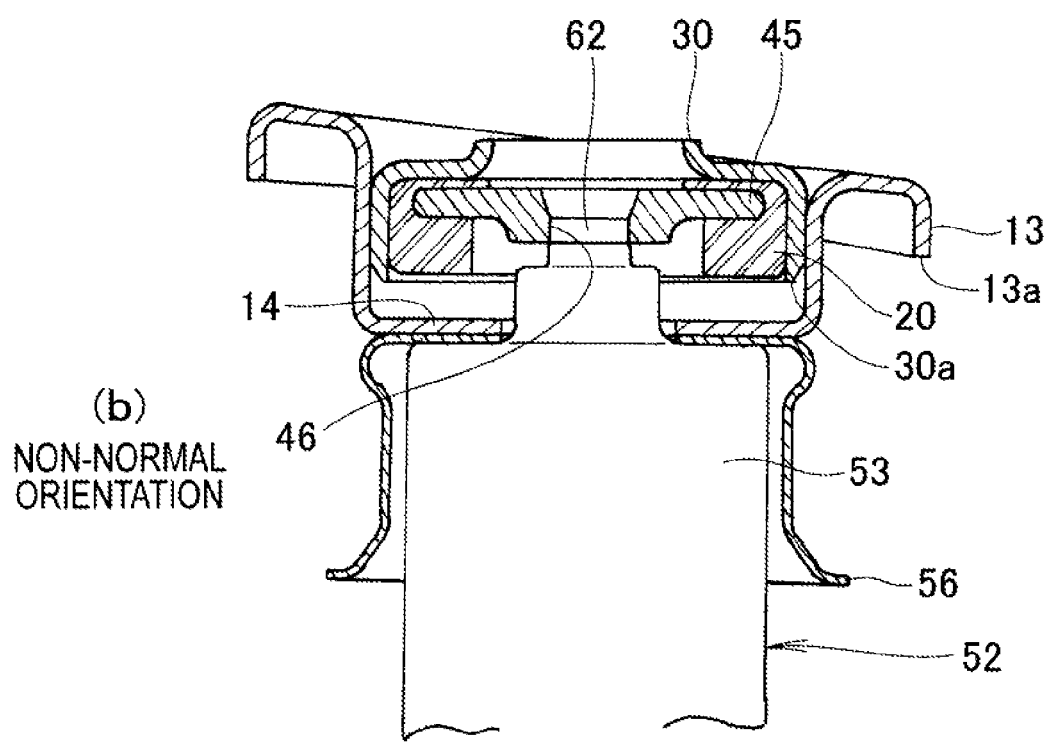
(b) NON-NORMAL ORIENTATION

FIG.7
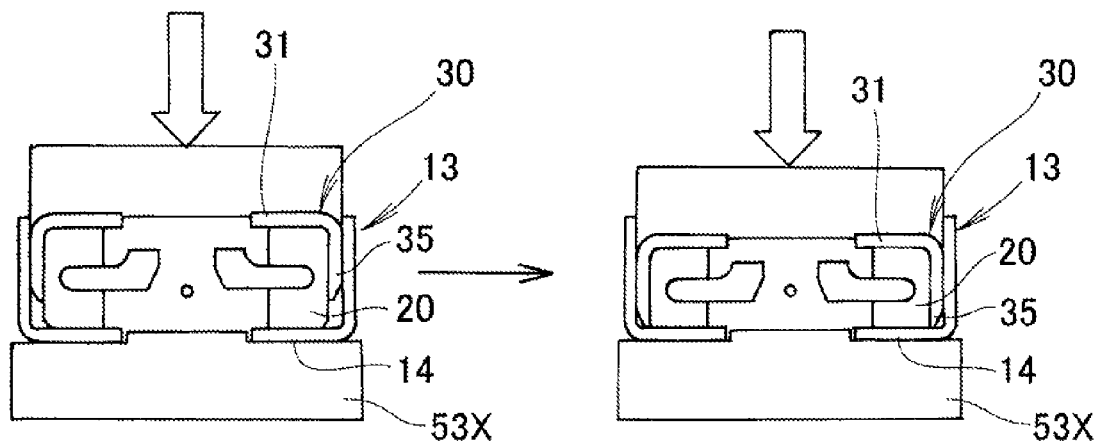
(a) COMPARATIVE EXAMPLE
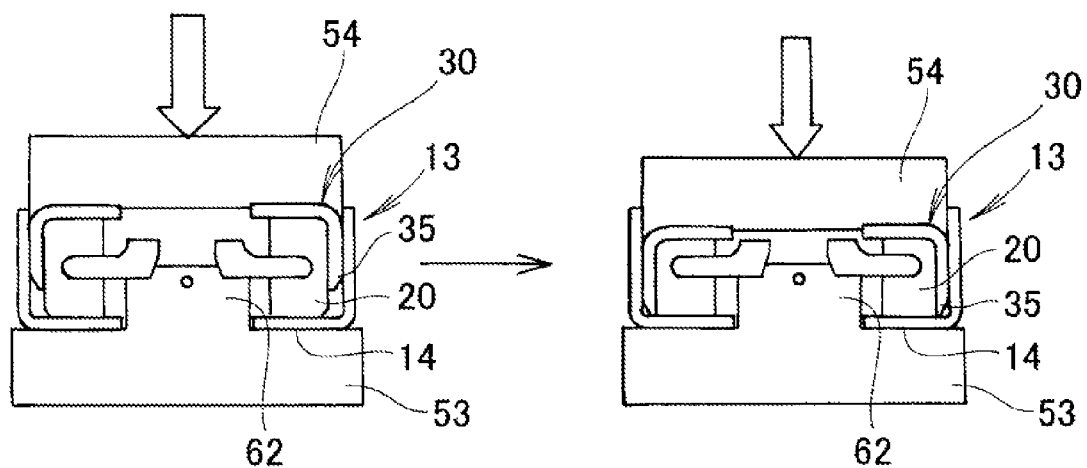
(b) INVENTIVE EMBODIMENT

SUSPENSION SUPPORT STRUCTURE

TECHNICAL FIELD

The present invention relates generally to a suspension mechanism employed on a vehicle and, more particularly, to an improvement in a suspension support structure for supporting an upper end of a piston rod of a damper.

BACKGROUND ART

In a suspension mechanism, an upper end of a piston rod of a cushion damper is supported on a vehicle body through a suspension support. Among suspension supports, a so-called input-separation-type suspension support structure is proposed in which an elastic member is disposed between an upper end of a piston rod and a vehicle body so as to prevent a load on the piston rod upper end from directly applied to the vehicle body (see Patent Literature 1).

The suspension support structure disclose in Patent Literature 1 comprises an elastic member covering a washer part fixed to the upper end of the damper, and a retainer part for retaining the elastic member in a sandwiched manner by a bearing member bearing the elastic member from below and a lid member placed on top of the elastic member. The retainer part is fastened to the vehicle body by means of plurality of fastening members.

In the arrangement according to Patent Literature 1, the lid member and the bearing member of the damper retainer part are fastened to each other by means of a plurality of fastening members, namely, a bolt and a nut. In addition, since the damper retainer part to be fastened by plural fastening members has a configuration resulted by laying the bearing member and the lid member one over the other, the weight will be added up to the suspension support. There is therefore a demand for a technique to reduce the weight light-weighing of the suspension support.

PRIOR ART LITERATURE

Patent Literature

Patent Literature 1: JP 2009-264551 A

SUMMARY OF INVENTION

Technical Problem

It is an object of the present invention to provide a technique for weight-reduction of a suspension support structure.

Solution to Problem

According to a first aspect of the present invention, there is provided a suspension support structure for supporting an upper part of a piston rod of a damper on a vehicle body, which structure comprises: a base member having a flange part adapted to be coupled to the vehicle body, a peripheral wall part extending from the flange part, and a bottom part provided at a lower end of the peripheral wall part and allowing passage of the piston rod therethrough, the base member supporting an upper part of the piston rod and the elastic member on the bottom part; and a lid member configured to be pressed toward the bottom part of the base member in such a manner as to cover at least an upper surface of the elastic member and fitted within the peripheral wall part.

In a second aspect of the invention, the elastic member has an outer peripheral surface, and the lid member is press-fitted between the base member and the elastic member in such a manner as not to allow the outer peripheral surface to contact the peripheral wall part.

According to a third aspect of the invention, the lid member has a piston-rod-axial-direction lower end part brought into abutment with the bottom part, the lower end part has an elastic-member-contacting inner surface being made flat, and an escape part formed on an outer surface opposed to the peripheral wall part and spaced from the peripheral wall part.

In a fourth aspect of the invention, a curved part is formed at a corner between the peripheral wall part and the bottom part, and the escape part has a depth larger than a depth of the curved part.

In a fifth aspect of the invention, as the lid member is attached to the base member, an upper end part of the lid member is positioned below an upper end part of the peripheral wall part.

In a sixth aspect of the invention, in the piston-rod-axial-direction, part of the vehicle body is positioned in an overlapping relation to the lid member.

Advantageous Effects of Invention

According to the first aspect of the present invention, the suspension support structure comprises the base member and the lid member press-fitted thereinto. This makes it unnecessary to provide a fastening member for integrating the lid member into the base member. Because the fastening member becomes unncecessary, weight-reduction of the suspension support becomes possible.

In addition, since means for coupling the lid member with the base member is press-fitting, a quality maintenance operation on the elastic member built in the suspension support can be secure. Accordingly, both weight-reduction of, and quality maintenance operations on the suspension support become possible.

Note also that the base member and the lid member are both formed easily by press-shaping sheet materials. The lid member is coupled with the base member by press-fitting. By virtue of the press-fitting, a joining process that includes fastening and welding becomes unnecessary, thereby enabling production of the suspension support at a reduced cost.

In the second aspect of the invention, the lid member is press-fitted in such a manner as not to allow the outer peripheral surface of the elastic member to contact the peripheral wall part. By thus putting the lid member into press-fitted engagement with the base member keeping the outer peripheral surface of the elastic member not to contact peripheral wall part, there will no longer be a fear that part of the elastic member sticks out into the peripheral wall part as the press-fitting surface. As a result, it becomes possible to keep the variation of performance of the suspension support to a minimum.

In the third aspect of the invention, the piston-rod-axial-direction lower end part of the lid member has on the elastic member side the surface which is made flat. Since the elastic member contacts the flat surface of the lid member, the transformed shape of the elastic member is stabilized. In addition, the escape part is formed on the peripheral-wall-part side of the lid member. By virtue of the escape part, it becomes possible to suppress part of the elastic member to stick out inbetween the bottom part of the base member and the lower end part of the lid member upon transformation of the elastic member. Owing to the suppression of the elastic member stick-out, characteristics of the suspension support becomes stable.

In the fourth aspect of the invention, the curved part provided between the peripheral wall part and the bottom part of the base member is set to have depth larger than the depth of the escape part of the lid member. As a result, there is no fear of the lower end part of the lid member hitting the base member as the lid member is pressed-fitted within the base member.

According to the fifth aspect of the invention, the upper end part of the lid member is positioned below the upper end part of the peripheral wall part. Since the upper end part of the lid member does not protrude beyond the upper end part of the peripheral wall part, there is no fear that other members undesirably hit the lid member and a load is applied to the latter. Since no undesired load is applied to the lid member, no distortion whatsoever will arise at a peripheral portion of the lid member as the press-fitting portion.

In the sixth aspect of the invention, part of the vehicle body is positioned in an overlapping relation to the lid member. The lid member can be supported even when the peripheral part as the press-fitting portion is disengaged from the peripheral wall part.

BRIEF DESCRIPTION OF DRAWINGS

FIG. 6 illustrate press-fitted depths differing depending on a direction of pressing; and FIG. 7 illustrate press-fitting processes of suspension supports according to a comparative example and an embodiment of the invention.

MODE FOR CARRYING OUT INVENTION

A preferred embodiment of the present invention will be described in detail below with reference to the accompanying drawings.

Embodiment

Figure 1:
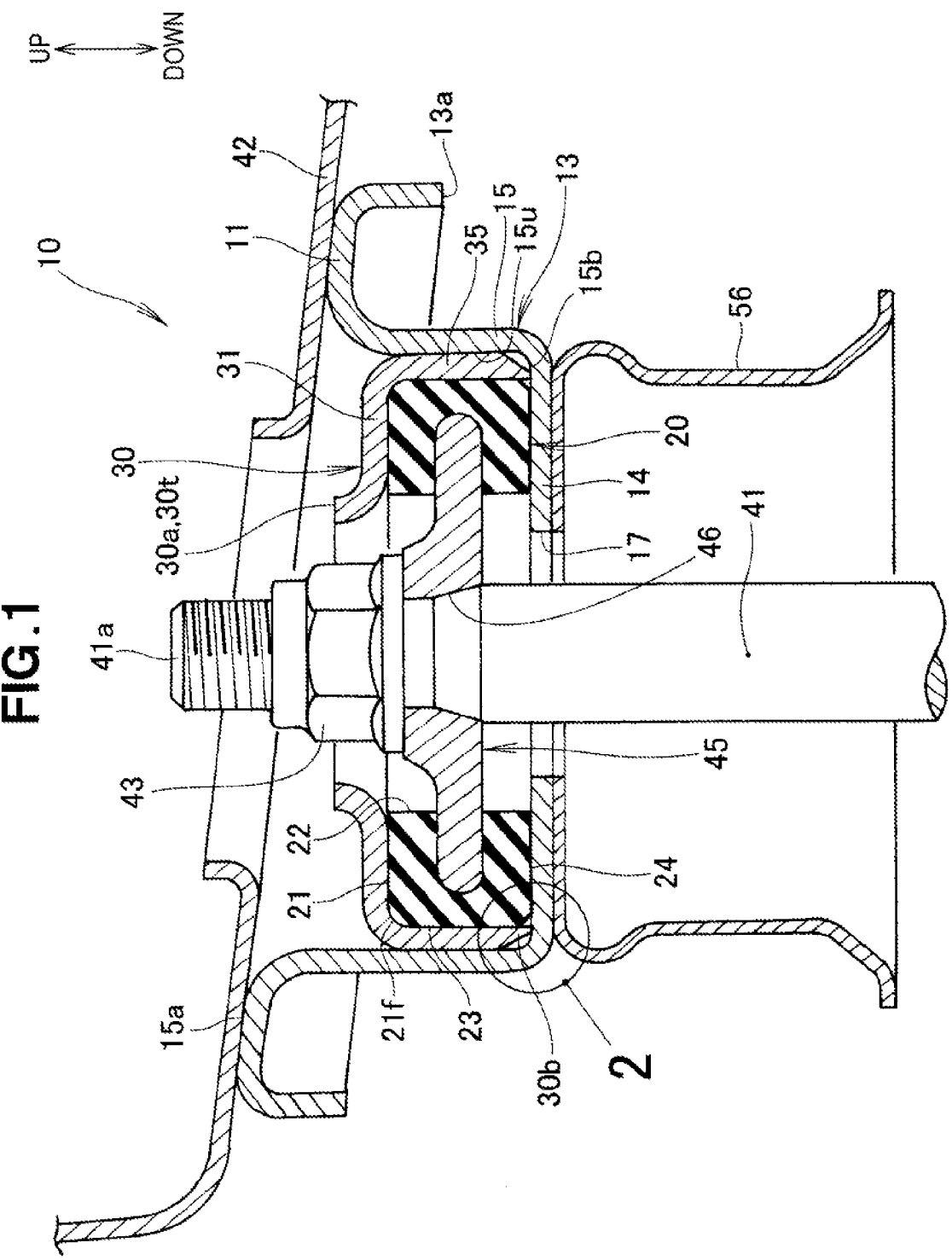
FIG. 1 is a cross-sectional view illustrating a suspension support structure according to the present invention.

As shown in FIG. 1, a suspension support 10 is an elastic member support apparatus which is comprised of a bottomed tubular base member 13 having at an open end thereof a flange 11 to be connected to a vehicle body, and a bottomed tubular lid member 30 press-fitted therewith in such a manner as to cover from above an elastic member 20 supported on a bottom part 14 of the base member 13. With openings of the base member 13 and the lid member 30 placed in opposed relation to each other, the elastic member support apparatus 10 supports elastic member 20 with the base member 13 and the lid member 30.

Namely, in the present embodiment, the elastic member support apparatus 10 is the suspension support 10 for supporting on the vehicle body an upper end 41a of a damper piston rod 41. Hereinafter, the elastic member support apparatus 10 will also be called the suspension support 10.

The base member 13 of the suspension support 10 is comprised of the flange 11 to be connected to a member 42 on a vehicle body side, a tubular (outer) peripheral wall part 15 extending from the flange 11, and the bottom (wall) part 14 which is formed at a lower end 15b of the peripheral wall part, has a through-hole 17 for allowing passage of the piston rod 41 and supports the elastic member 20 supporting an upper part of the piston rod 41. In the embodiment being described, means for connecting the base member 13 to the vehicle-body-side member comprises a bolt and a nut, not shown.

The lid member 30 of the suspension support 10 includes a tubular peripheral part (inner peripheral wall part) 35 and a top plate part 31 provided at an upper end of the inner peripheral wall part 35. The lid member 30 is pressed toward the bottom (wall) part 14 of the base member 13 and fitted within an inner surface 15u. The lid member 30 covers at least an upper surface 21 of the elastic member 20.

The elastic member 20 accommodated between the base member 13 and the lid member 30 comprises polyurethane integrally formed with a washer-shaped intermediate member 45 fastened to a distal end of the piston rod 41 of a cushion damper by means of a nut 43. The intermediate member 45 is positioned at a thicknesswise intermediate part of the elastic member 20. The piston rod 41 of the damper is passed through a hole 46 formed in the intermediate member 45. The nut 43 is brought from above into threaded engagement with the distal end of the piston rod 41.

The elastic member 20 is a donut-shaped member having an opening part 22 exposed at a part where the intermediate member 45 is fastened to piston rod 41, the upper surface 21 abutted against, the top plate part 31 of the lid member 30, an outer peripheral surface 23 extending from an edge 21f of the upper surface downwardly along an axial direction of the piston, and a lower surface 24 extending from a lower end of the outer peripheral surface 23 along the axial direction of the piston.

In FIG. 1, as the lid member 30 is mounted to the base member 13, upper end part 30t of the lid member comes below an upper end part 15a of the peripheral wall part. The upper end part 30t of the lid member is free from a fear of being applied with a load because it does not protrude from the upper end part 15a of the peripheral wall part and other members hit the lid member 30. Since no load is applied to the lid member 30, distortion or the like is unlikely to arise at the press-fitting part, namely, the peripheral part (inner peripheral wall part) 35 of the lid member.

Description will now be made as to a positional relationship upon attachment of the suspension support 10 to the vehicle-side member 42. At axially upper part of the piston rod 41, the vehicle-side member 42 is positioned over the lid member 30 n an overlapping fashion. The lid member 30 can be supported by the vehicle-side member 42 even when the (inner) peripheral part 35 as the press-fitting part comes off from the outer peripheral wall part 15.

Next, discussion will be made as to a relationship between a corner, formed between the peripheral wall part and the bottom part of the base member; and an opening end of the lid member.

Figure 2:
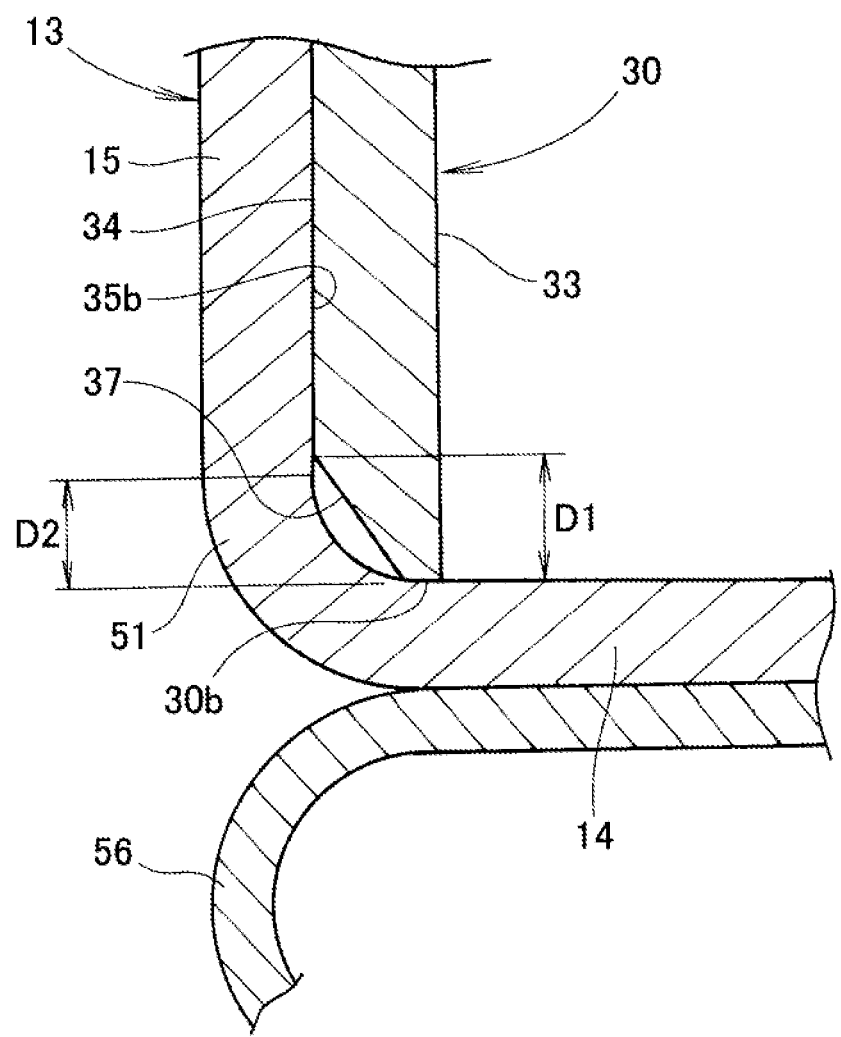
FIG. 2 is an enlarged view showing region 2 of FIG. 1.

As shown in FIG. 2, a curved part 51 is formed at the corner between the peripheral wall part 15 of the base member and the bottom part of the base member. At a lower end 30b of the lid member 30, an inner surface 33 abutted against the elastic member 30 (FIG. 1) is made flat while an outer surface 34 abutted against an inner surface of the peripheral wall part 15 of the base member 13 is provided with an escape part 37 spaced from the peripheral wall part 15. Depth D1 of the escape part 37 is set to be larger than depth D2 of the curved part 51. Next, description will be made as to a method of assembling the suspension support having the above-described arrangement.

Figure 3:
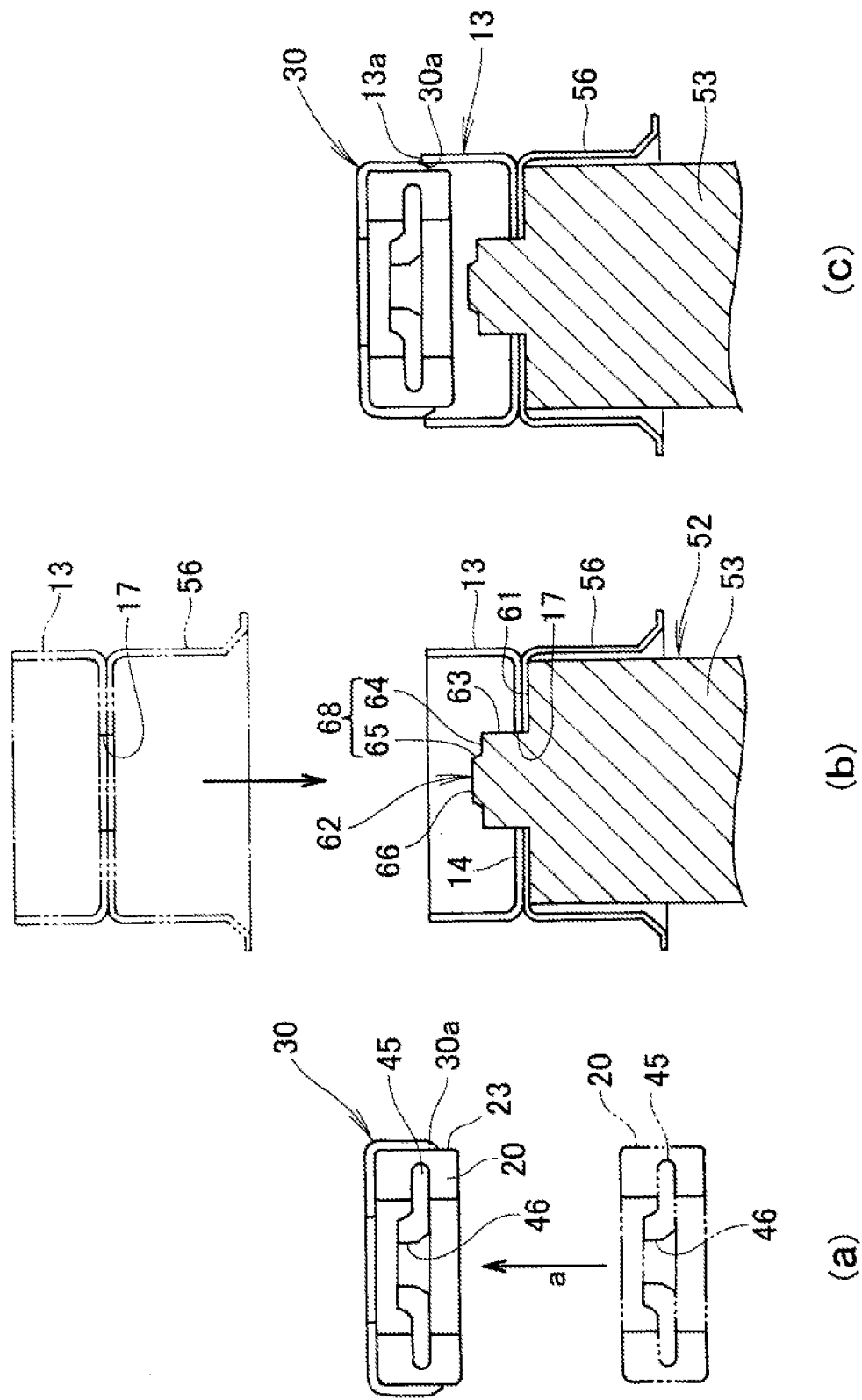
FIG. 3 illustrate part of a process of manufacture (elastic member fitting—lid member temporary coupling) of a suspension support.

Shown in FIG. 3(a) is a process for press-fitting the elastic member 20 into the lid member 30, as shown by arrow a, such that part of the outer peripheral surface 23 of the elastic member 20 is exposed from the opening end 30a of the lid member 30.

As shown in FIG. 3(b), a lower jig 53 forming a press-fitting jig set 52 is provided, followed by placing the base member 13 integrated with a skirt part 56 of the lower jig 53 on the lower jig 53.

The lower jig 53 is comprised of a bearing surface 61 for bearing a load from the bottom part 14 of the base ember and a protruding part 62 for being engaged in the through-hole 17 of the base member and for supporting the intermediate member 45 (FIG. 3a) during a press-fitting operation. The protruding part 62 includes an outer wall 63 extending in a height direction, a horizontal bearing part 64 formed horizontally at an upper end of the outer wall 63 for supporting the intermediate member 45, an inclined bearing part 65 extending obliquely upwardly for supporting the intermediate member 45, and an upper surface 66 formed horizontally at an upper end of the inclined bearing part 65. Engaging part 68 is formed jointly by the horizontal bearing part 64 and the inclined bearing part 65.

As shown in FIG. 3(c), the lid member 30 is placed on the base member 13 with the opening end 30a of the lid member 30 mated with opening end 13a of the base member 13.

Figure 4:
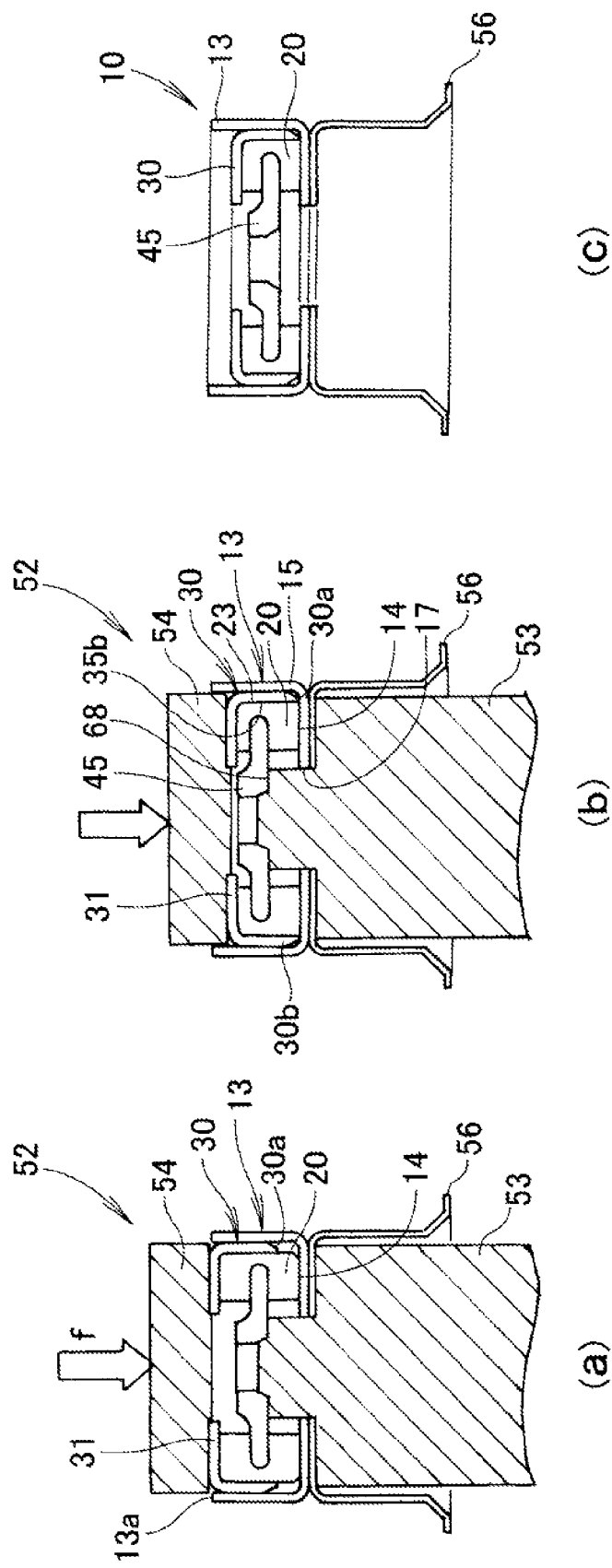
FIG. 4 illustrate part of a process of manufacture (compressing—press-fitting finish) of the suspension support.

In FIG. 4(a), a process for temporarily coupling the lid member 30 and the base member 13 is illustrated. In this process, an upper jig 54 forming the press-fitting jig set 52 is placed on the top plate part 31 of the lid member 30. Then, with the opening end 30a of the lid member oriented toward the opening end 13a of the base member, a force is applied in the direction of arrow f until only that part of the elastic member 20 which projects out from the opening end 30a of the lid member comes into abutment against the bottom wall part 14 of the base member 13.

FIG. 4(b) illustrates a compression process and a press-fitting process. In the compression process, while supporting, with an engaging part 68 of the press-fitting jig 52 passed through the through-hole formed in the bottom wall part 14, the intermediate member 45 provided at the thicknesswise center part of the elastic member 20, the elastic member 20 is compressed from above the top plate part 31 toward the bottom wall part 14 so as to reduce the height of the elastic member 20. In the press-fitting process, the lid member 30 is press-fitted into the base member 13 until the opening end 30a of the lid member comes into abutment against the bottom wall part 14 of the base member. More specifically the lid member 30 is pressed until its piston-axis-direction lower end 30b hits the bottom wall part 14.

Referring also to FIG. 2, the outer peripheral surface 23 of the elastic member 20 is brought into abutting engagement with an inner surface 35b of the inner peripheral wall part 35. The lid member 30 is press-fitted inbetween the base member 13 and the elastic member 20 in such a manner as not to allow other parts of the outer peripheral surface 23 of the elastic member than those parts of the outer peripheral surface which extend in the piston-axis direction to contact the outer peripheral wall part 15.

By press-fitting the lid member 30 with the other parts of the outer peripheral surface 23 of the elastic member than those extending in the piston-axis direction kept away from the outer peripheral wall part 15, as described above, there will be no fear that the elastic member 20 may bite into the inner surface 35b of the outer peripheral wall part as the press-fitting surface. As a result, it becomes possible to keep the undesired performance variation among suspension supports to a minimum.

Since the depth D1 of the escape part 37 of lid member 30 is set to be larger than the depth D2 of the curved part 51 formed between the bottom wall part 14 and the outer peripheral wall part 15 of the base member, there will be no fear of the lower end part 30b of the lid member interfering with the curved part 51 as the lid member 30 is press-fitted into the base member 13.

At the piston-axis-direction lower end 30b, the lid member 30 has on the side of the elastic member 20 the inner surface 33 which is flat. Because the elastic member 20 abuts against the flat surface of the lid member 30, the deformed shape of the elastic member 20 can be stabilized. In addition, the escape part 37 is formed on that surface of the lid member 30 which is opposed to the peripheral wall part. By virtue of the escape part 37, it becomes possible to suppress entry of the elastic member 20 between the bottom wall part 14 of the base member 13 and the lower end part 30b of the lid member 30 upon deformation of the elastic member 20. As a result, characteristics of the suspension support become stable.

Referring to FIG. 4(c), the suspension support 10 is shown which is finished with press-fitting the elastic member 20 and has passed through the process of canceling the support force supporting the thicknesswise center part of the elastic member 20.

Next, referring to FIG. 5, discussion will be made as to a dimensional relationship between the intermediate member integrated into the elastic member and the press-fitting jig set.

Figure 5:
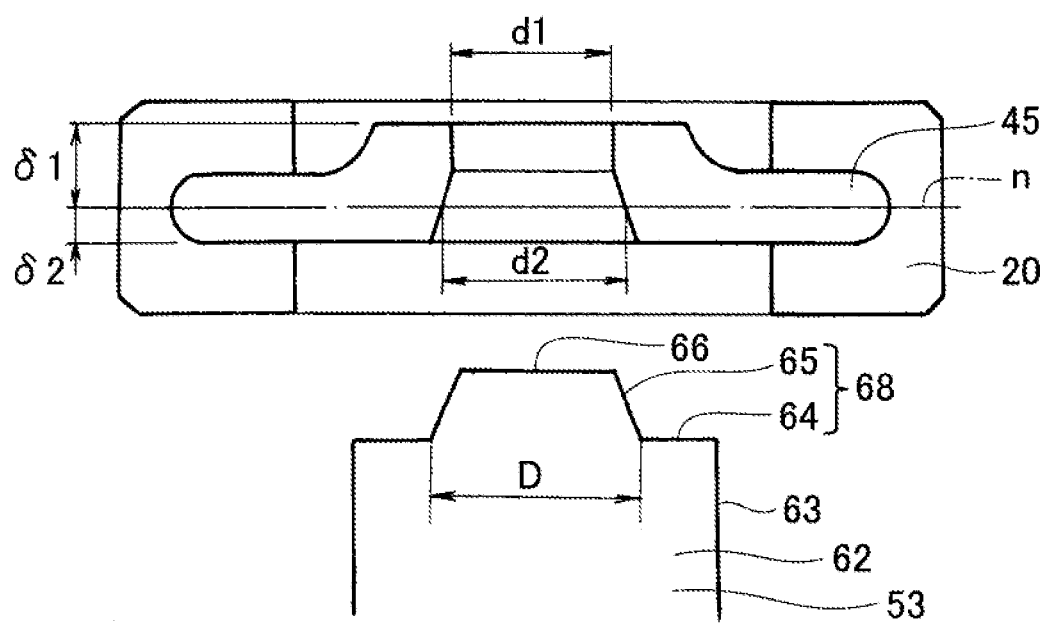
FIG. 5 is a schematic view illustrating a relationship in terms of dimension etc. between an in-pressing jig and an intermediate member.

As shown in FIG. 5, the lower end of the inclined bearing part 65 of a protruding part 62 of the lower jig has an outer diameter D while the opening at the upper surface of the intermediate member 45 is set to have a diameter d1. In addition, the opening of the intermediate member 45 at a heightwise center line n of the elastic member 20 is set to have a diameter d2. These diameters have the relationship of d1<D<d2.

Distance between the heightwise center line n of the elastic member 20 and the upper surface of the intermediate member 45 is δ1 while distance from the heightwise center line n of the elastic member 20 to the lower surface of the intermediate member 45 is set to be δ2. These distances are set to satisfy the relationship of δ2<δ1. That is, the intermediate member 45 integrated into the elastic member, as a whole, is positioned offset upward from the heightwise center line n.

Next, explanation will be made as to the press-fitting height or depth that, during a press-fitting operation in the press-fitting process, varies depending on the orientations of the intermediate member owing to the dimensional and positional relationships of the above-described elements.

As shown in FIG. 6(a), when the elastic member 20 is pressed in with the intermediate member 45 held in a normal orientation, that is, upside up, the lid member 30 is press-fitted in until the opening 30a of the lid member 30 abuts against the bottom part 14 of the base member 13.

When the elastic member 20 is pressed in with the intermediate member 45 held in a non-normal orientation, that is, upside down, the lid member 30 is not press-fitted in until the opening 30a of the lid member 30 abuts against the bottom part 14 of the base member 13. That is, the press-fitting degree is set to be less than a normal press-fitting degree. The reason for this will be described with reference to FIG. 5 as well.

The upper-surface-side inner diameter d1 of the intermediate member 45 is smaller than the outer diameter D of the inclined bearing part 65 forming the engaging part 68 (d1<D). Thus, the protruding part 62 is incapable of engaging in the hole 46 of the intermediate member 45. Another reason is that due to the intermediate member 45 positioned upside down, the end surface of the intermediate member 45 supported by the protruding part 62 comes closer to the end surface of the elastic member 20 than when the intermediate member 45 is positioned in a normal orientation, whereby press-in tolerance or allowance becomes small.

In this manner, when the elastic member 20 integrated with the intermediate member 45 is pressed in in a non-normal orientation, the press-in depth varies so as not to reach the normal press-in depth. As a result, it becomes possible to detect mis-assembling such as press-in of the elastic member 20 in wrong orientation.

The press-fitting jig set. 52 is a single member capable of engaging with both front and rear sides of the intermediate member 45. Desirably, the jig set may be a single member engageable with the intermediate member 45 only when the elastic member 20 is press-fitted in in normal orientation so that the degree of heightwise compression of the elastic member 20 varies to thereby enable easy detection of mis-assemblage.

An operation of the above-explained suspension support (elastic member support apparatus) will be discussed next.

Shown as a comparative example in FIG. 7(a) is an elastic member support apparatus arranged such that the elastic member 20 is pressed in between a top plate part of the lid member 30 and the bottom wall part 14 of the base member 13. When a lower jig 53X is not provided with a protruding part (corresponding to the protruding part 62 of the described inventive embodiment) for bearing the intermediate member 45, the process for press-fitting the elastic member 20 is carried out by compressing a portion between the thicknesswise upper and lower ends of the elastic member 20. However, as the elastic member 20 is compressed, part of the elastic member 20 often sticks out from the lid member 30 and gets stuck between the bottom wall part 14 of the base member 13 and the inner peripheral wall part 35 of the lid member 30.

In contrast, in the inventive embodiment shown in FIG. 7(b), while supporting the thicknesswise intermediate part of the elastic member 20 from the bottom wall part 14 toward the lid member 30, the elastic member 20 is pressed with the upper jig 54 from above to compress the upper part thereof so as to be press-fitted into the inner peripheral wall part of the lid member 30.

Arrangements have been made so as to compress the elastic member 20 toward the bottom wall part 14 while supporting the thicknesswise intermediate portion (position of the heightwise center line n of FIG. 5) of the elastic member 20. Support of the thicknesswise intermediate portion of the elastic member 20 enables the upper part of the elastic member 20 (part higher than the heightwise center line n of FIG. 5) to be compressed strongly. At this time, the lower part of the elastic member 20 will also be compressed. Since the upper part of the elastic member is compressed strongly while the lower part of the elastic member is also compressed, the elastic member 20 will not stick out from the lid member 13. Consequently, the elastic member 20 can be press-fitted between the base member 13 and the lid member 30 without injuring the workability of the press-fitting operation.

Turning back to FIG. 1, the suspension support comprises the base member 13 and the lid member 30 press-fitted thereinto. Integration of the lid member 30 with the base member 13 is effected using pressure. Thus, there is no need to provide a fastening member, a swag operation and so forth for integration of the lid member 30 with the base member 13. With the fastening member rendered needless, weight-reduction of the suspension support 10 becomes possible. In addition, because coupling of the lid member 30 with the base member 13 is effectuated by press-fitting, ready maintenance operations with respect to the elastic member 20 built in the suspension support 10 can be secured. Consequently, in accordance with the present invention, both weight-reduction of, and ready maintenance operations on the suspension support can be achieved.

The lid member 30 is coupled with the base member 13 by means of a press-fitting operation. Press-fitting makes such coupling processes as fastening, welding and so forth. Further, since both the base member 13 and the lid member 30 can be formed easily by press-forming sheet materials, the suspension support 10 can be manufactured at a reduced cost.

The suspension support 10 is fastened to the vehicle-side member 42 by means of a bolt and a nut. In a conventionally-known suspension support that comprises a base member and a lid member, coupling of the suspension support itself and coupling of the suspension support to a vehicle-side member have been achieved by means of the so-called "co-fastening" using a bolt and a nut. In this instance, maintenance efficiency with respect to the elastic member disposed between the base member and the lid member can be secured. On the other hand, dimensional variations of vehicle-body-side members are likely to cause press-fitted conditions of the elastic members to vary. This may injure damper support performance.

In contrast, in the present invention, the elastic member is press-fitted into the suspension support while fastening of the suspension support to the vehicle-body-side member is achieved by using a bolt and a nut. Consequently, there is no fear that dimensional variations of vehicle-body-side members will adversely affect the press-fitted conditions of the elastic member.

The present invention has thus far been described as being applied to an automobile but it may similarly be applied to a three-wheeled motor vehicle or to other generally-known vehicles.

INDUSTRIAL APPLICABILITY

The present invention is particularly useful as suspension supports for application to automobiles.

REFERENCE SIGNS LIST

10 . . . elastic member support apparatus (suspension support);
11 . . . flange part;
13 . . . base member;
14 . . . bottom (wall) part;
15 . . . (outer) peripheral wall part;
15a . . . upper end part of peripheral wall part;
20 . . . elastic member;
23 . . . outer peripheral surface;
30 . . . lid member;
30b . . . piston-axis-direction lower end part of lid member;
30t . . . upper end part of lid member;
33 . . . inner surface held in contact with elastic member;
34 . . . outer surface on peripheral wall part side;
37 . . . escape part;
41 . . . piston rod;
41a . . . upper end of piston rod;
42 . . . vehicle body (vehicle-body-side member);

51 ... curved part;
D1 ... depth of escape part; and
D2 ... depth of curved part

The invention claimed is:

1. A suspension support structure for supporting an upper part of a piston rod of a damper on a vehicle body, said suspension support structure comprising:
   a bottomed tubular base member having an open end facing upward, the base member including a flange part extending radially outward from the open end and adapted to be coupled to the vehicle body, a tubular peripheral wall part extending vertically downward from an inner edge of the flange part, and a bottom part provided at a lower end of the peripheral wall part and having a through-hole for allowing passage of the piston rod therethrough;
   an elastic member supported on the bottom part of the base member and adapted to be connected to the upper part of the piston rod; and
   a bottomed tubular lid member having an open end facing downward, the lid member including a tubular peripheral wall part and a top plate part provided at an upper end of the peripheral wall part of the lid member,
   wherein the tubular peripheral wall part of the lid member is press-fitted into the tubular peripheral wall part of the base member to thereby join the base member and the lid member with the elastic member accommodated therebetween, the top plate part of the lid member covering an upper surface of the elastic member, and
   wherein the lid member has an upper end located below the inner edge of the flange part of the base member, and the lid member is held out of contact with the vehicle body.

2. The suspension support structure according to claim 1, wherein the tubular peripheral wall part of the lid member has a piston-rod-axial-direction lower end part brought into abutment with the bottom part of the base member, the lower end part has an elastic-member-contacting inner surface being made flat, and an escape part formed on an outer surface opposed to the peripheral wall part of the base member and spaced from the peripheral wall part of the base member.

3. The suspension support structure according to claim 2, wherein the base member has a curved part formed at a corner between the peripheral wall part and the bottom part of the base member, and the escape part has a depth larger than a depth of the cover part.

4. The suspension support structure according to claim 3, wherein, in the piston-rod-axial-direction, part of the vehicle body is positioned in an overlapping relation to the lid member.

5. The suspension support structure according to claim 2, wherein, in the piston-rod-axial-direction, part of the vehicle body is positioned in an overlapping relation to the lid member.

6. The suspension support structure according to claim 1, wherein, in the piston-rod-axial-direction, part of the vehicle body is positioned in an overlapping relation to the lid member.

7. A suspension support structure for supporting an upper part of a piston rod of a damper on a vehicle body, and suspension support structure comprising:
   a base member having a flange part adapted to be coupled to the vehicle body, a peripheral wall part extending from the flange part, and a bottom part provided at a lower end of the peripheral wall part and allowing passage of the piston rod therethrough, the base member supporting the upper part of the piston rod and an elastic member on the bottom part; and
   a lid member configured to be pressed toward the bottom part of the base member in such a manner as to cover at least an upper surface of the elastic member and fitted within the peripheral wall part;
   wherein the lid member has a piston-rod-axial-direction lower end part brought into abutment with the bottom part, the lower end port has an elastic-member-contacting inner surface being made flat, and an escape part formed on an outer surface opposed to the peripheral wall part and spaced from the peripheral wall part,
   wherein the base member has a curved part formed at a corner between the peripheral wall part and the bottom part thereof, and
   wherein the escape part has a depth larger than a depth of the curved part.

8. The suspension support structure according to claim 7, wherein the elastic member has an outer peripheral surface, and the lid member is press-fitted between the base member and the elastic member in such a manner as not to allow the outer peripheral surface to contact the peripheral wall part.

9. The suspension support structure according to claim 8, wherein, when the lid member is attached to the base member, an upper end part of the lid member is positioned below an upper end part of the peripheral wall part.

10. The suspension support structure according to claim 7, wherein, when the lid member is attached to the base member, an upper end part of the lid member is positioned below an upper end part of the peripheral wall part.

11. The suspension support structure according to claim 7, wherein, in the piston-rod-axial-direction, part of the vehicle body is positioned in an overlapping relation to the lid member.

* * * * *